United States Patent
Kataoka

(10) Patent No.: US 8,085,867 B2
(45) Date of Patent: Dec. 27, 2011

(54) PREAMBLE DESIGN METHOD

(75) Inventor: Nobuhisa Kataoka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 593 days.

(21) Appl. No.: 12/294,622

(22) PCT Filed: Apr. 27, 2006

(86) PCT No.: PCT/JP2006/308872
§ 371 (c)(1),
(2), (4) Date: Sep. 26, 2008

(87) PCT Pub. No.: WO2007/125581
PCT Pub. Date: Nov. 8, 2007

(65) Prior Publication Data
US 2010/0239045 A1    Sep. 23, 2010

(51) Int. Cl.
*H04L 27/28* (2006.01)
(52) U.S. Cl. .......................... 375/295; 370/328; 370/491
(58) Field of Classification Search .................. 375/295; 370/328, 491, 496, 500, 513, 512, 514
See application file for complete search history.

(56) References Cited

U.S. PATENT DOCUMENTS

| | | |
|---|---|---|
| 6,944,119 B1 | 9/2005 | Sudo et al. |
| 2005/0013383 A1 | 1/2005 | Sudo et al. |
| 2005/0152327 A1* | 7/2005 | Erlich et al. ................ 370/343 |
| 2005/0180353 A1* | 8/2005 | Hansen et al. .............. 370/328 |
| 2006/0013186 A1* | 1/2006 | Agrawal et al. ............. 370/344 |
| 2006/0050799 A1 | 3/2006 | Hou et al. |
| 2007/0195906 A1* | 8/2007 | Kim et al. ................... 375/267 |
| 2007/0263564 A1* | 11/2007 | Hansen et al. .............. 370/328 |
| 2008/0310351 A1* | 12/2008 | Hansen et al. .............. 370/328 |

FOREIGN PATENT DOCUMENTS

| | | |
|---|---|---|
| JP | 11 145930 | 5/1999 |
| JP | 2000 68973 | 3/2000 |
| JP | 2000 201131 | 7/2000 |

(Continued)

OTHER PUBLICATIONS

Onizaw, Takeshi et al., "Synchronization Scheme of OFDM systems for high speed wireless LAN", The Institution of Electronics, Information and Communication Engineers, Technical Report of IEICE, DSP97-165, SAT97-122, RCS97-210, pp. 137-142, 1998, (with English abstract and partial English translation).

(Continued)

*Primary Examiner* — Chieh M Fan
*Assistant Examiner* — Aristocratis Fotakis
(74) *Attorney, Agent, or Firm* — Oblon, Spivak, McClelland, Maier & Neustadt, L.L.P.

(57) ABSTRACT

A preamble design method of generating a preamble for a plurality of symbols using time waveform data of a specific symbol in an OFDM communication system includes a dividing step of dividing the time waveform data of the specific symbol into a plurality of blocks equivalent to number of symbols in the preamble, a symbol-unit-block selecting step of selecting a separate block from among divided blocks in units of symbols in the preamble, and a symbol-unit time-waveform-data generating step of generating time waveform data having a different pattern for each of the symbols by generating time waveform data for a single symbol in which a selected block is set as a leading block and data are cyclically arranged from leading data in the selected block.

5 Claims, 7 Drawing Sheets

FOREIGN PATENT DOCUMENTS

JP    2005-210690    8/2005

OTHER PUBLICATIONS

Japanese Decision of a Patent Grant issued Nov. 9, 2010, in Patent Application No. 2008-513028 (with English-language translation).

Wen Lei, et al., "A Robust Frequency Acquisition Algorithm for OFDM Systems", Wireless Personal Multimedia Communications, IEEE, XP010619065, vol. 1, Oct. 27, 2002, pp. 145-148.

Supplementary Search Report issued Dec. 3, 2010, in European Patent Application No. 06732423.6-2415 / 2012453.

* cited by examiner

TIME WAVEFORM DATA OF SINGLE SYMBOL

DATA OF FIRST SYMBOL IN PREAMBLE

DATA OF SECOND SYMBOL IN PREAMBLE

DATA OF THIRD SYMBOL IN PREAMBLE

DATA OF FOURTH SYMBOL IN PREAMBLE

TIME WAVEFORM DATA OF SINGLE SYMBOL

DATA OF FIRST SYMBOL IN PREAMBLE

DATA OF SECOND SYMBOL IN PREAMBLE

DATA OF THIRD SYMBOL IN PREAMBLE

DATA OF FOURTH SYMBOL IN PREAMBLE

PREAMBLE DESIGN METHOD

TECHNICAL FIELD

The present invention generally relates to a preamble design method in a data communication system that implements an OFDM mechanism, and more particularly, to a preamble design method suitable in a multipath environment.

BACKGROUND ART

An OFDM (Orthogonal Frequency Division Multiplexing) mechanism is used in a data communication system such as a wireless LAN system. In a wireless LAN system, various aspects such as communication distance through a transmission line or a shielding material therein determine whether it is possible to perform high-speed transmission or only low-speed transmission. In a transmission line of a wireless LAN system, an adaptive modulation technology is implemented in which a modulation technique is adaptively varied depending on the condition of the transmission line to enable high-speed transmission as much as possible without degrading communication quality parameters such as bit error rate (BER) and the like.

In the data communication system, the condition of the transmission line is obtained, e.g., by measuring an SIR (Signal to Interference power Ratio) in a known signal (preamble). A preamble can be designed from, e.g., a plurality of symbols by repeatedly arranging identical data as disclosed in Nonpatent Literature 1.

Nonpatent Literature 1: "Synchronization scheme of OFDM systems for high speed wireless LAN", Journal of Institute of Electronics, Information and Communication Engineers (IEICE), Technical report RCS 97-210, 1998-01.

DISCLOSURE OF INVENTION

Problem to be Solved by the Invention

Conventionally, the OFDM mechanism includes a guard interval that prevents degradation in the communication quality due to multipath waves. Howbeit, the communication quality is degraded if a delay wave larger than the guard interval occurs.

On the other hand, even if a delay wave occurs, the adaptive modulation technology appropriately determines a modulation technique such that data communication of a desired quality can be performed. However, e.g., if the delay wave is larger than the guard interval, then the precision of the SIR measured in the preamble gets affected. That makes it difficult to apply an appropriate modulation technique thereby degrading the communication quality.

The present invention has been achieved to solve the above problems in the conventional technology and it is an object of the present invention to provide a preamble design method that enables efficient implementation of the adaptive modulation technology, i.e., application of an appropriate modulation technique in a data transmitter even when a delay wave larger than a guard interval occurs in the multipath environment.

Means for Solving Problem

To solve the above problems and to achieve the object, a preamble design method according to the present invention is for generating a preamble for a plurality of symbols using time waveform data of a specific symbol in an OFDM communication system. The preamble design method includes a dividing step of dividing the time waveform data of the specific symbol into a plurality of blocks equivalent to number of symbols in the preamble; a symbol-unit-block selecting step of selecting a separate block from among divided blocks in units of symbols in the preamble; and a symbol-unit time-waveform-data generating step of generating time waveform data having a different pattern for each of the symbols by generating time waveform data for a single symbol in which a selected block is set as a leading block and data are cyclically arranged from leading data in the selected block. The preamble is configured with the time waveform data having the different pattern for each of the symbols.

Effect of the Invention

A preamble design method according to an aspect of the present invention enables efficient implementation of an adaptive modulation technology even when a delay wave larger than a guard interval occurs in a multipath environment.

BRIEF DESCRIPTION OF DRAWINGS

FIG. 2-1 is a diagram for explaining an exemplary preamble design method according to the present invention.

FIG. 2-2 is a diagram for explaining an exemplary preamble design method according to the present invention.

FIG. 2-3 is a diagram for explaining an exemplary preamble design method according to the present invention.

FIG. 2-4 is a diagram for explaining an exemplary preamble design method according to the present invention.

FIG. 2-5 is a diagram for explaining an exemplary preamble design method according to the present invention.

FIG. 3 is an exemplary schematic diagram of an M-sequence generator.

FIG. 4 is a diagram for explaining data that is transmitted in the adaptive modulation system.

FIG. 5 is an exemplary graph of a computer-simulated verification of an advantageous effect according to a first embodiment of the present invention.

FIG. 6-1 is a diagram for explaining an exemplary preamble design method according to the present invention.

FIG. 6-2 is a diagram for explaining an exemplary preamble design method according to the present invention.

FIG. 6-3 is a diagram for explaining an exemplary preamble design method according to the present invention.

FIG. 6-4 is a diagram for explaining an exemplary preamble design method according to the present invention.

FIG. 6-5 is a diagram for explaining an exemplary preamble design method according to the present invention.

EXPLANATIONS OF LETTERS OR NUMERALS

1 OFDM modulator (MOD)
2 transmission line
3 OFDM demodulator (DEM)
4 SIR measuring unit (SIR)
5 determining unit
11 M-sequence generator
31, 32 memory unit
33 reading unit
34 counter

BEST MODE(S) FOR CARRYING OUT THE INVENTION

Exemplary embodiments for an OFDM modulator and a preamble design method according to the present invention will be described below in detail with reference to the accompanying drawings. The present invention is not limited to the embodiments described below.

First Embodiment

Figure 1:
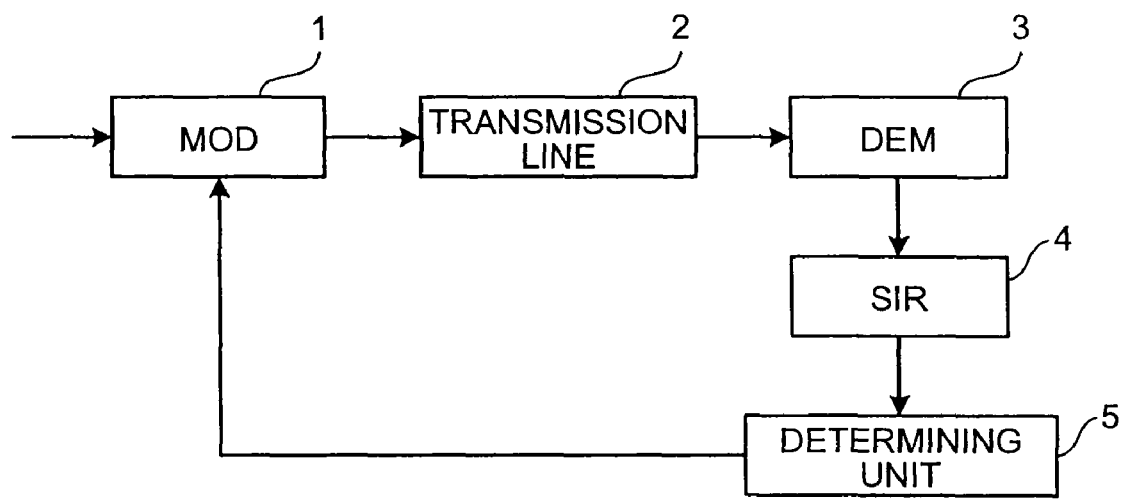
FIG. 1 is a schematic diagram of an adaptive modulation system that includes an OFDM modulator according to the present invention.

FIG. 1 is a schematic diagram of an adaptive modulation system that includes an OFDM modulator according to the present invention. The adoptive modulation system includes an OFDM modulator (MOD) 1 arranged in a communication device on a transmitting side (transmitting device), a transmission line 2, an OFDM demodulator (DEM) 3 arranged in a communication device on a receiving side (receiving device), an SIR measuring unit (SIR) 4, and a determining unit 5. In the preamble design method according to the first embodiment, a preamble is generated in the OFDM modulator 1. Subsequently, the preamble is attached to data and output from the transmitting device along with the data.

Given below is a brief description of the operations in the adaptive modulation system. The OFDM modulator 1 performs modulation of each sub-carrier by using a modulation technique determined by the determining unit 5 and transmits a post-modulation transmission signal over the transmission line 2. The transmission signal passes through the transmission line 2 and the OFDM demodulator 3 demodulates the transmission signal to obtain post-demodulation reception data. The SIR measuring unit 4 measures the SIR of each sub-carrier from the post-demodulation reception data. The determining unit 5 determines a modulating technique for each sub-carrier based on a measurement result of the SIR measuring unit 4. More particularly, in the case of a sub-carrier having a high SIR, the determining unit 5 determines a modulation technique having higher modulation level such as the 64 QAM technique, which can simultaneously transmit a plurality of bits. On the other hand, in the case of a sub-carrier having a low SIR, the determining unit 5 determines a modulation technique having lower modulation level such as the BPSK technique, which is robust against noise. However, if a conventional problem such as occurrence of a delay wave arises such that the SIR measurement precision is affected, then there is a possibility that a modulation technique having higher modulation level but less robustness against noise such as the 64 QAM technique is mistakenly determined for a sub-carrier having a low SIR. That results in large number of errors thereby degrading the communication quality. Thus, in the adaptive modulation system, obtaining a correct SIR measurement value is important.

Figures 1, 2:
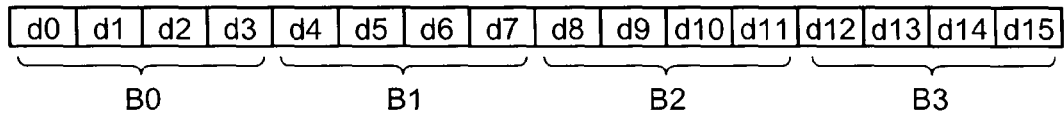
Figure 2:
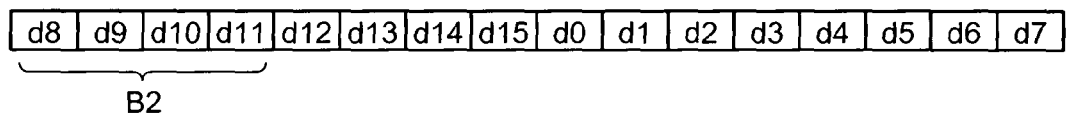
Figures 2, 3:
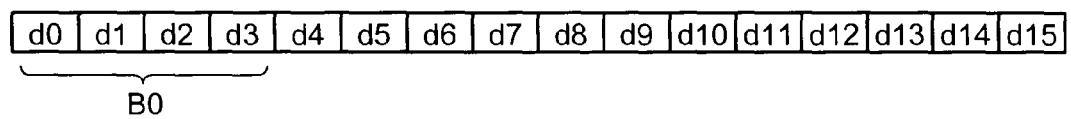
Figures 2, 3, 4:
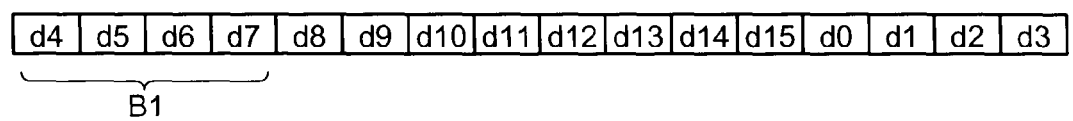

Given below is the description of the preamble design method according to the first embodiment. FIG. 2 (FIGS. 2-1 to 2-5) is a diagram for explaining an exemplary preamble design method according to the present invention. More particularly, FIG. 2-1 shows time waveform data of a single symbol. The time waveform data includes 16 data units (d0 to d15). FIG. 2-2 shows time waveform data of a first symbol in a preamble generated by using the time waveform data of the single symbol. FIG. 2-3 shows time waveform data of a second symbol in the preamble. FIG. 2-4 shows time waveform data of a third symbol in the preamble. FIG. 2-5 shows time waveform data of a fourth symbol in the preamble.

First, the time waveform data of the single symbol (FIG. 2-1) is divided into a plurality of blocks. In FIG. 2-1, the time waveform data is shown divided into four blocks (B0 to B3).

Subsequently, the time waveform data of the first symbol in a preamble is generated (see FIG. 2-2) by selecting a first block number from among the four blocks (B0 to B4) and cyclically arranging data units starting with a leading data unit in the selected block. In the example shown in FIG. 2-1, the block B2 is selected as the first block and the data units are cyclically arranged starting from a leading data unit d8 in the block B2. That is, the data units are cyclically arranged in the sequence of d8, d9, . . . , d15, d0, d1, . . . , d7 to generate rearranged time waveform data of a symbol (16 data units). In other words, the rearranged time waveform data is generated by cyclically time shifting the time waveform data shown in FIG. 2-1.

The time waveform data of the second symbol in the preamble (see FIG. 2-2) is generated in an identical manner (by cyclically time shifting the time waveform data shown in FIG. 2-1). In that case, a second block number (block B0 in FIG. 2-1) is selected instead of selecting the first block number that is used to generate the first symbol.

The time waveform data of the third symbol in the preamble and the fourth symbol in the preamble are also generated in an identical manner (by cyclically time shifting the time waveform data shown in FIG. 2-1). In that case, a third block number and a fourth block number (block B1 and block B3 in FIG. 2-1) are selected, respectively.

The four block numbers have random values and can be generated by using a shift register value of an M-sequence generator. The description of generating the block numbers is given below with reference to FIG. 3. FIG. 3 is a diagram of an M-sequence generator 11 having two columns and three rows of a shift register. Meanwhile, four block numbers are required as shown in FIG. 2-1. Thus, the M-sequence generator 11 in FIG. 3 having three rows generates the block numbers. For example, if an initial value of the shift register is "11", then the next value becomes "01" and the value after that becomes "10". That is, when converted in the decimal number format, the block numbers are represented as a row '3, 1, 2'. Because four block numbers are necessary, '4' is added to form a row '3, 1, 2, 4'. However, in the example shown in FIG. 2, because the block numbers are assigned from zero-origin (starting from '0'), '1' is subtracted from each element of the row '3, 1, 2, 4' to obtain a row '2, 0, 1, 3'. The elements of the row '2, 0, 1, 3' are assigned as the block numbers. Thus, the block numbers can be randomly generated by maintaining the randomness of the row of the M-sequence generator 11. In this way, the four symbols in the preamble, (see FIGS. 2-2 to 2-5) are generated from the time waveform data of the single symbol (see FIG. 2-1).

FIG. 4 is a diagram for explaining data that is transmitted in the adaptive modulation system. As shown in FIG. 4, the SIR measurement is performed in a preamble arranged ahead of a user data portion.

In a conventional preamble design, the time waveform data of the single symbol (see FIG. 2-1) is arranged in a simple repetitive pattern. In that case, if a delay wave larger than the guard interval occurs, the SIR measurement value increases. More particularly, when each symbol in a preamble is identical, the guard interval length increases equivalently. As a result, if a delay wave occurs, it becomes difficult to recognize the interference due to the delay wave at the time of SIR measurement. When the SIR measurement value increases, a modulation technique having higher modulation level and less robustness against noise is mistakenly determined for a sub-carrier having a low SIR. That results in large number of errors thereby degrading the communication quality.

On the contrary, in the preamble design according to the present invention, each symbol in a preamble has a different pattern of the time waveform data. Thus, the conventional problem of increase in the SIR measurement value does not occur. That facilitates in achieving good communication quality.

Figures 2, 3, 4, 5:
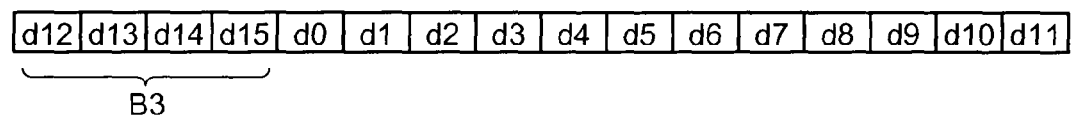
Figure 3:
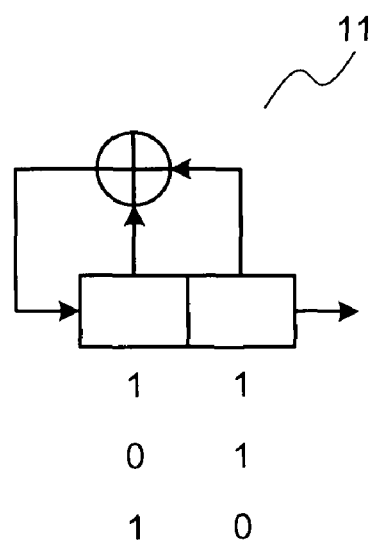
Figure 4:
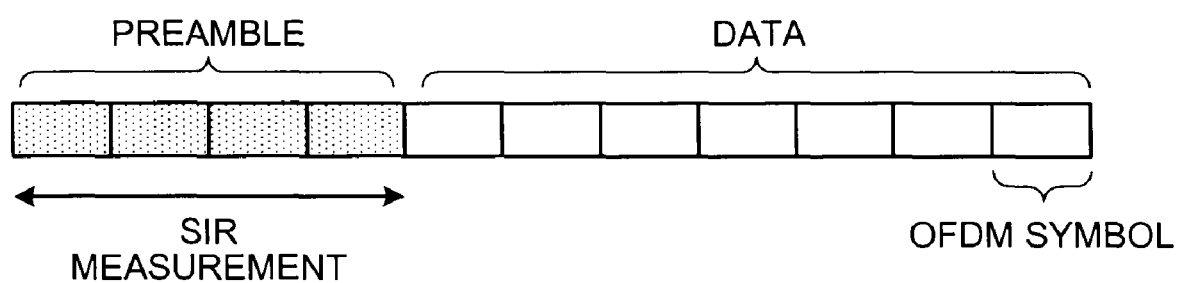
Figure 5:
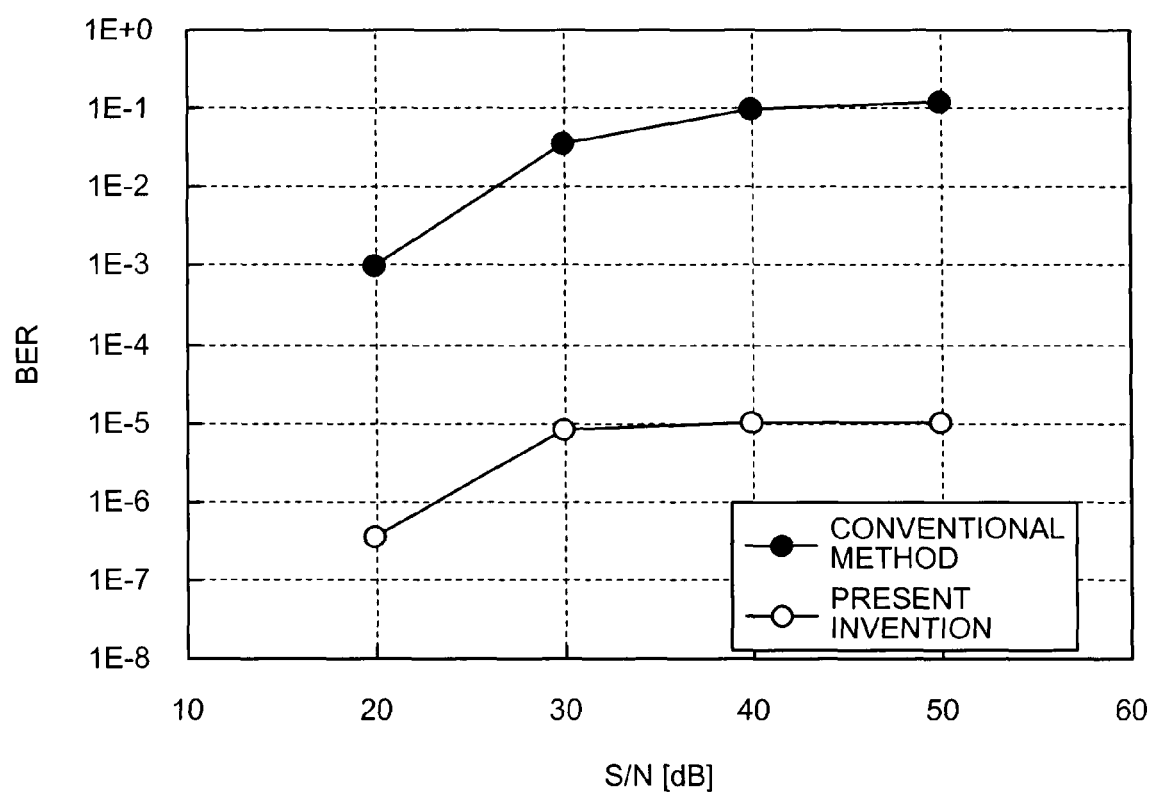

Given below is the description of the advantageous effect according to the first embodiment. FIG. 5 is an exemplary graph of a computer-simulated verification of the advantageous effect according to the first embodiment under an assumption that a delay wave has occurred. In the computer simulation, adaptive modulation is performed such that the BER does not exceed 10E-4. Meanwhile, the number of OFDM sub-carriers is set to 256. Six modulation techniques, viz., the BPSK technique, the QPSK technique, the 16 QAM technique, the 64 QAM technique, the 256 QAM technique, and the 1024 QAM technique are implemented. The number of symbols in a preamble is set to 14.

As shown in FIG. 5, the communication quality parameter (BER) of a conventional preamble configuration is degraded. However, according to the first embodiment, a BER not exceeding 10E-4 is achieved. Meanwhile, the parameters used for the computer simulation are not limited to the abovementioned values.

As described above, according to the first embodiment, an adaptive modulation technology can be efficiently implemented even when a delay wave larger than a guard interval occurs in a multipath environment.

Second Embodiment

Figures 1, 6:
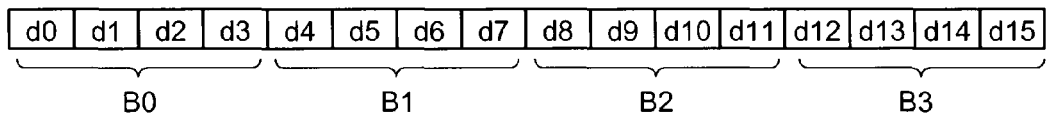
Figures 2, 6:
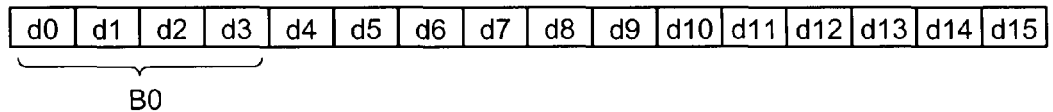
Figures 3, 6:
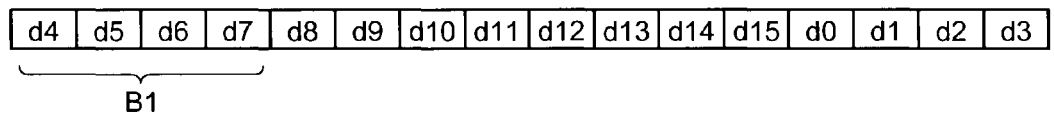
Figures 4, 6:
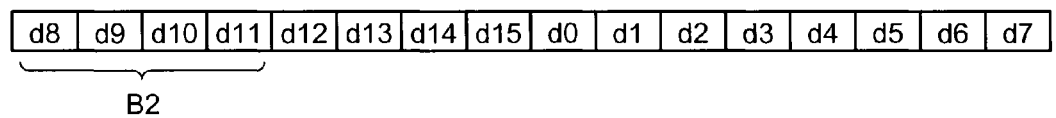
Figures 5, 6:
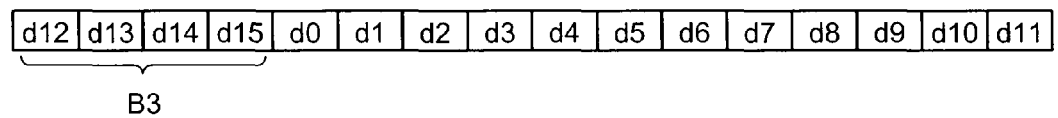

FIG. 6 (FIGS. 6-1 to 6-5) is a diagram for explaining an exemplary preamble design method according to the present invention. The preamble design method shown in FIG. 6 is a simplified version of the preamble design method shown in FIG. 2. According to the second embodiment, the circuit is simplified by numbering the blocks in a serial manner. More particularly, in contrary to randomly determining data starting positions by using the M-sequence generator 11 shown in FIG. 3 according to the first embodiment, data starting positions are serially numbered starting from '0' according to the second embodiment.

For example, in FIG. 6, four symbols in a preamble, are generated (see FIGS. 6-2 to 6-5). The leading block of each symbol is assigned in the order of four divided block numbers, viz., the block B0, the block B1, the block B2, and the block B3. Subsequently, the data units are cyclically arranged in each symbol starting with a leading data unit of the leading block. That is, the data units of the first symbol in the preamble are arranged in the sequence of d0, d1, . . . , d14, d15. The data units of the second symbol in the preamble are arranged in the sequence of d4, d5, . . . , d2, d3. The data units of the third symbol in the preamble are arranged in the sequence of d8, d9, . . . , d6, d7. The data units of the fourth symbol in the preamble are arranged in the sequence of d12, d13, . . . , d10, d11. Thus, according to the second embodiment, there is no need to use an M-sequence generator.

In this way, even when the leading block of each symbol in the preamble is serially numbered, the symbol has a different pattern of the time waveform data. As a result, alike in the case of the first embodiment, it is possible to achieve good communication quality even if a delay wave larger than a guard interval occurs in the multipath environment. Moreover, by eliminating the need to use an M-sequence generator in the second embodiment, it is possible to simplify the circuit configuration as compared to the first embodiment.

Figure 7:
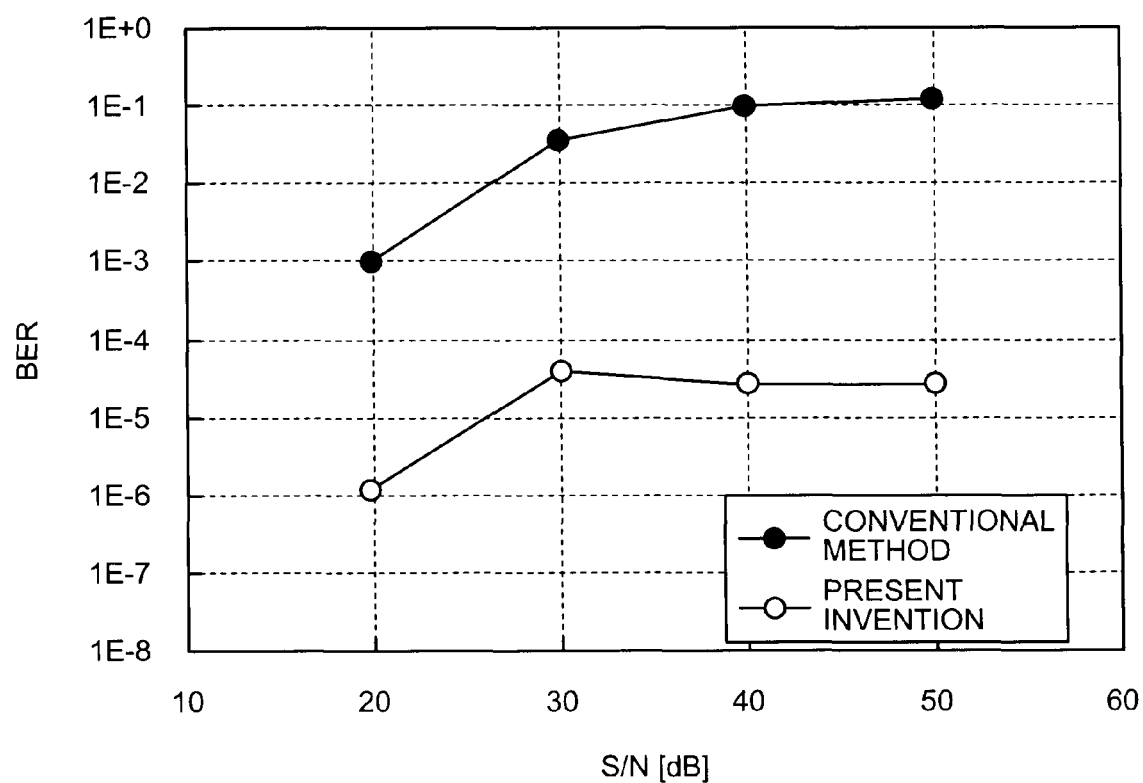
FIG. 7 is an exemplary graph of a computer-simulated verification of an advantageous effect according to a second embodiment of the present invention.

FIG. 7 is an exemplary graph of a computer-simulated verification of the advantageous effect according to the second embodiment under an assumption that a delay wave has occurred. The advantageous effect according to the second embodiment is verified under identical conditions as described with reference to FIG. 5. As shown in FIG. 7, the communication quality parameter (BER) of a conventional preamble configuration is degraded. However, according to the second embodiment, a BER not exceeding 10E-4 is achieved. Meanwhile, the parameters used for the simulation are not limited to the abovementioned values.

Third Embodiment

Figure 8:
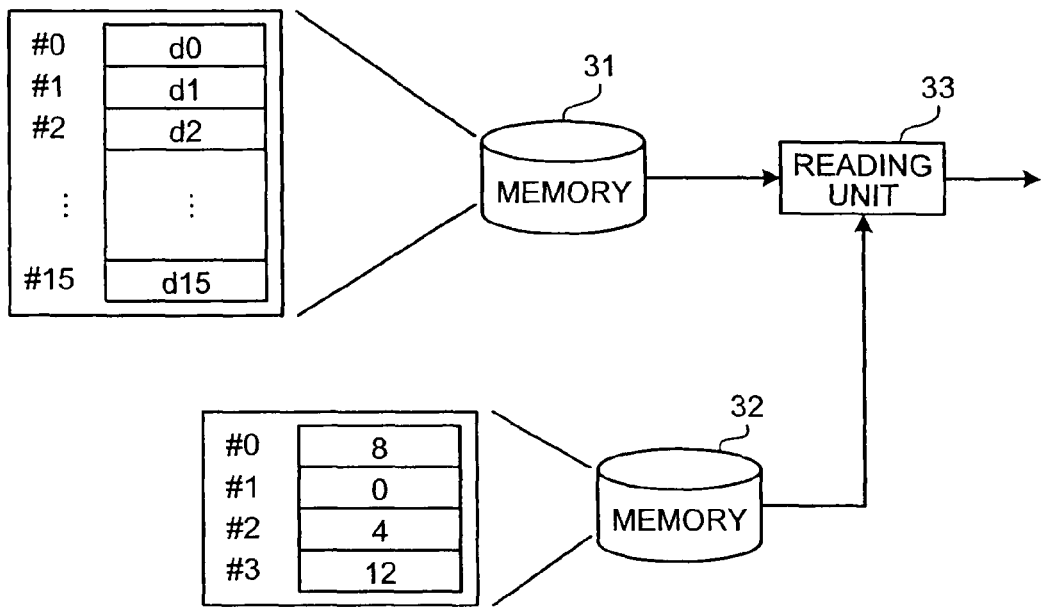
FIG. 8 is a diagram for explaining a preamble design method by using two memory units.

FIG. 8 is a diagram for explaining a preamble design method by using two memory units. The preamble design method is performed by using two memory units 31 and 32, and a reading unit 33.

The data units of a single symbol in the preamble are stored in the memory unit 31. In the example shown in FIG. 8, 16 data units d0 to d15 are stored at read start addresses #0 to #15. To read data from the memory unit 31, the reading unit 33 first reads a value from the memory unit 32 corresponding to a read start address in the memory unit 31. The values in the memory unit 32 corresponding to the read start addresses in the memory unit 31 can be stored such that the block numbers are either assigned randomly as described in the first embodiment or assigned sequentially as described in the second embodiment.

In the example shown in FIG. 8, the values stored in the memory unit 32 are 8, 0, 4, and 12. In the case of the first symbol in the preamble, first, the reading unit 33 reads from an address #0 of the memory unit 32 the value 8 corresponding to a read start address. The reading unit 33 then reads the data units from the memory unit 31 starting with the data unit d8, which is stored at the read start address #8, in the sequence of d8, d9, . . . , d15, d0, . . . , d6, d7 (total of 16 data units). Similarly, in the case of the second symbol in the preamble, the reading unit 33 first reads from an address #1 of the memory unit 31 the value 0 corresponding to a read start address. The reading unit 33 then reads the data units from the memory unit 31 starting with the data unit d0, which is stored at the read start address #0, in the sequence of d0, d1, d14, d15 (total of 16 data units). In the case of the third symbol in the preamble, the reading unit 33 first reads from an address #2 of the memory unit 31 the value 4 corresponding to a read start address. The reading unit 33 then reads the data units from the memory unit 31 starting with the data unit d4, which is stored at the read start address #4, in the sequence of d4, d5, . . . , d15, d0, d1, d2, d3 (total of 16 data units). In the case of the fourth symbol in the preamble, the reading unit 33 first reads from an address #3 of the memory unit 31 the value 12 corresponding to a read start address. The reading unit 33 then reads the data units from the memory unit 31 starting with the data unit d12, which is stored at the read start address #12, in the sequence of d12, d13, d14, d15, d0, . . . , d10, d11 (total of 16 data units).

In this way, according to the third embodiment, the symbols in a preamble can be generated by using two memory units. Thus, it is possible to generate a different pattern of the time waveform data for each symbol in a preamble by implementing a simple circuit configuration.

Fourth Embodiment

Figure 9:
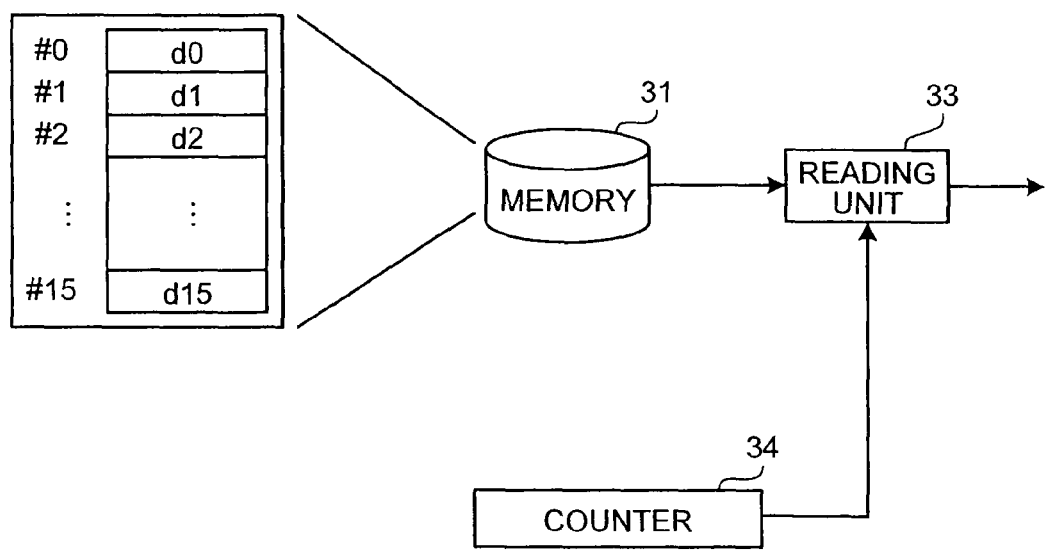
FIG. 9 is a diagram for explaining a preamble design method by using a memory unit and a counter.

FIG. 9 is a diagram for explaining a preamble design method by using a memory unit and a counter. The preamble design method is performed by using the memory unit 31, a counter 34, and the reading unit 33. For example, the counter ascends count values 0, 4, 8, and 12 such that the block numbers are assigned sequentially as described in the second embodiment.

According to the fourth embodiment, the reading unit 33 reads the data units from the memory unit 31 based on a count value of the counter 34. More particularly, in the case of the first symbol in a preamble, when the count value of the counter 34 is '0', the reading unit 33 reads the data units from the memory unit 31 starting with the data unit d0, which is stored at the read start address #0, in the sequence of d0, d1, d14, d15 (total of 16 data units). In the case of the second symbol in the preamble, when the count value of the counter 34 is ascended to '4', the reading unit 33 reads the data units from the memory unit 31 starting with the data unit d4, which is stored at the read start address #4, in the sequence of d4, d5, ..., d15, d0, d1, d2, d3 (total of 16 data units). In the case of the third symbol in the preamble, when the count value of the counter 34 is ascended to '8', the reading unit 33 reads the data units from the memory unit 31 starting with the data unit d8, which is stored at the read start address #8, in the sequence of d8, d9, ..., d15, d0, ..., d6, d7 (total of 16 data units). In the case of the fourth symbol in the preamble, when the count value of the counter 34 is ascended to '12', the reading unit 33 reads the data units from the memory unit 31 starting with the data unit d12, which is stored at the read start address #12, in the sequence of d12, d13, d14, d15, d0, ..., d10, d11 (total of 16 data units).

In this way, according to the fourth embodiment, the symbols in a preamble can be generated by using a memory unit and a counter. Thus, it is possible to generate a different pattern of the time waveform data for each symbol in the preamble by implementing a simple circuit configuration. Moreover, the counter is configured to count the values only in an ascending order by using a simple circuit configuration. Furthermore, replacing one of the memory units according to the third embodiment by the counter helps in reducing the memory size.

INDUSTRIAL APPLICABILITY

A preamble design method according to the present invention is suitable in an OFDM communication system and is particularly suitable in a multipath environment in which a delay wave larger than a guard interval occurs.

The invention claimed is:

1. A preamble design method of generating a preamble for a plurality of symbols using time waveform data of a specific symbol in an orthogonal frequency division multiplexing communication system, the preamble design method comprising:
dividing the time waveform data of the specific symbol into a plurality of blocks equivalent to a number of symbols in the preamble;
selecting a divided block from among the plurality of blocks;
generating each symbol in the preamble by setting a corresponding selected block as the leading block and arranging other blocks of the plurality of blocks cyclically after the leading block; and
configuring the preamble by contiguously arranging each symbol generated according to an order in which each selected block was selected, each symbol in the preamble having a different pattern from the other symbols in the preamble.

2. The preamble design method according to claim 1, wherein the dividing includes assigning a block number to each of the blocks in sequence from a leading block, and
the selecting includes performing a block selection such that a relationship between an order of the symbols in the preamble and the block number becomes random.

3. The preamble design method according to claim 1, wherein the dividing includes assigning a block number to each of the blocks in sequence from a leading block, and the selecting includes performing a block selection such that block numbers of leading blocks are serially assigned in an order of the symbols in the preamble.

4. A preamble design method of generating a preamble for a plurality of symbols using time waveform data of a specific symbol in an orthogonal frequency division multiplexing communication system, the preamble design method comprising:
storing the time waveform data of the specific symbol in a first memory;
storing a read start address of the first memory in a second memory, a number of read start addresses stored being equal to a number of symbols in the preamble;
generating each symbol in the preamble by reading the read start address from the second memory, and setting time waveform data stored at the read start address of the first memory as leading data and cyclically reading the stored time waveform data not corresponding to the read start address from the first memory; and
contiguously arranging each symbol generated into the preamble, each symbol generated having a different time waveform data pattern.

5. A preamble design method of generating a preamble for a plurality of symbols using time waveform data of a specific symbol in an orthogonal frequency division multiplexing communication system, the preamble design method comprising:
storing the time waveform data of the specific symbol in a memory;
generating each symbol in the preamble by obtaining a count value from a predetermined counter as a read start address of the memory, and setting time waveform data stored at the read start address as leading data and cyclically reading the stored time waveform data not corresponding to the read start address from the memory; and
contiguously arranging each symbol generated into the preamble, each symbol generated having a different time waveform data pattern.

\* \* \* \* \*